United States Patent Office 3,462,307
Patented Aug. 19, 1969

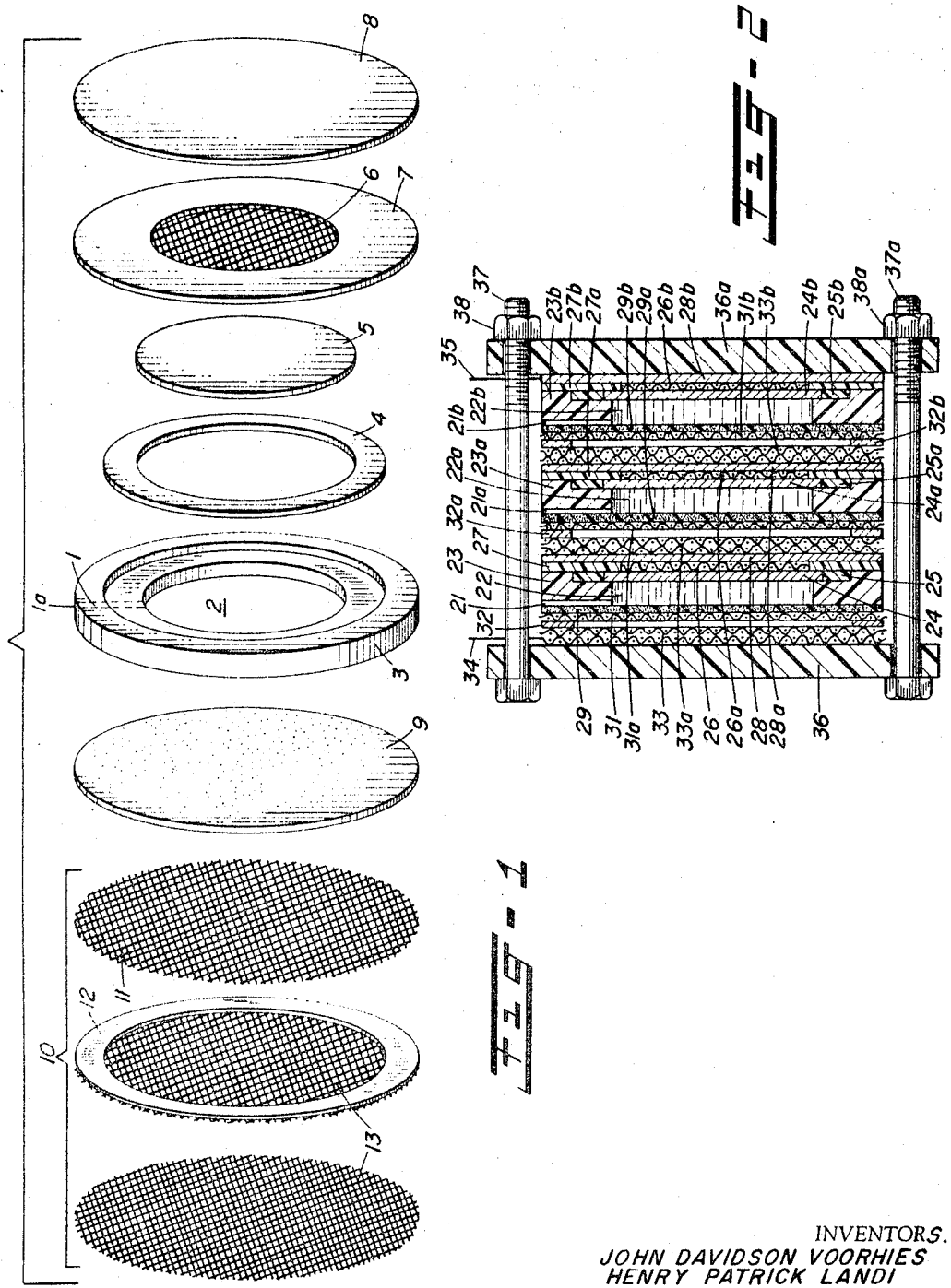

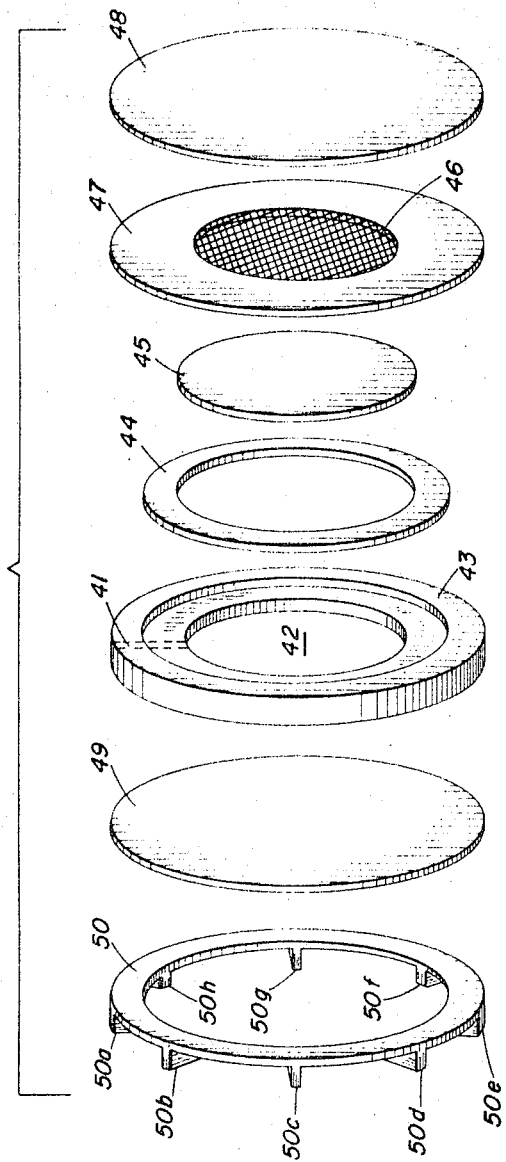

3,462,307
METAL-AIR BATTERY INCLUDING FIBRILLATED CATHODE
John Davidson Voorhies, New Canaan, Conn., and Henry Patrick Landi, Yorktown Heights, N.Y., assignors to American Cyanamid Company, Stamford, Conn., a corporation of Maine
Filed Apr. 28, 1966, Ser. No. 546,012
Int. Cl. H01m 27/06
U.S. Cl. 136—86           10 Claims The present invention relates to an improved alkaline metal-air battery. More particularly, it relates to an improved alkaline metal-air battery utilizing a novel graphite-filled, extensively fibrillated, porous polytetrafluoroethylene electrode structure as a cathode and has as its prinicpal object the utilization of such battery as an inexpensive power source.

Alkaline metal-air batteries have been long known. However, such batteries have not been extensively used in the art, since they are generally bulky, extremely heavy and possess relatively low power densities. Where excessive weight, large bulk and low energy densities can be tolerated, such batteries are found to be acceptable. In recent years, there has developed a real need for a relatively light weight, high energy density battery because of the advent of battery powered toothbrushes, electric shavers, tools and even vehicles. The provision of an alkaline metal-air battery would fulfill this need, if both its overall weight could be decreased and its power density be substantially increased.

It is, therefore, a principal object of the invention to provide an improved alkaline metal-air battery of enhanced power density and relatively low weight. It is a further object to provide a metal-air battery of enhanced power density and of extremely low overall weight and volume when utilizing a novel, highly porous, graphite-filled polytetrafluoroethylene electrode. Other objects and advantages will become apparent from a consideration of the following description.

To this end, there is provided a metal-air battery of relatively low weight, volume and enhanced power density. This is unexpectedly accomplished by incorporating a highly porous, graphite-filled, extensively fibrillated electrode which permits the ready transfer of air through said electrode while retaining liquid electrolyte within a confined area. The use of the novel electrode structure in conjunction with an electrode comprising a suitable metal, such as zinc, enhances the overall power density of a battery prepared therefrom, while simultaneously reducing substantially the overall total weight and volume.

According to the invention, there is provided either a single cell or, preferably, a battery of cells, each cell comprising essentially a cathode of a graphite-filled polytetrafluoroethylene, hereinbelow described with particularity. This cathode abuts an area constituting a reservoir in which there is confined an aqueous electrolyte. There is positioned an electropositive metal which directly contacts the electrolyte retained in the area provided. The opposite face of the cathode is provided with a metallic air spacer. The latter consists, in one embodiment, of a metallic structure of sufficient thickness to permit air to permeate therethrough and, finally, through the cathode. On the anode side of the cell, there is positioned a metallic spacer which abuts a metallic sheet. If desired, there is further provided a metallic screen which faces the metal anode so that contact of the electrode is made with the metal sheet. Electric current is passed from the anode to the steel sheet. Thus, there is provided a bipolar electrical contact in a multicell system.

On the addition of alkaline electrolyte to the above confined area, current flow can be detected by means of an ammeter by attaching a terminal wire lead from the metallic spacer on the cathode side to a terminal wire lead attached to the metallic sheet on the anode side of the cell.

In another embodiment, the aforementioned metallic air-spacer need not comprise a plurality of metallic screens. Rather, the spacer can be fabricated as a metallic ring structure having a plurality of protrusions on one face thereof and its opposite face is provided with a smooth surface which directly abuts the cathode as hereinabove defined.

In general, the anode employed in the cell of the present invention is an electropositive metal. Exemplary of the latter are: zinc, barium, magnesium or aluminum. There is also contemplated mixtures or alloys of the aforementioned metals including such other metals as manganese, calcium, cerium, mercury and zirconium. However, for optimum operation, zinc in its pure or alloyed form is the preferred metal anode.

The cathode of the present invention comprises a highly porous, extensively fibrillated, graphite-filled polytetrafluoroethylene structure. The latter is gas permeable but water impermeable. In preparing such structure, polymethylmethacrylate is heated and milled to a molten, viscous state at a temperature between about 170° C. and about 180° C. Polytetrafluoroethylene, in the form of an aqueous dispersion of finely divided particles, is gradually added to the molten polymethylmethacrylate, thereby forming interconnected and interwoven fibrils of polytetrafluoroethylene. As milling is continued, water is volatilized from the dispersion and graphite or any equivalent thereof is next incorporated into the milled mixture. The blend is removed from the mill and ground into pellets which are directly extruded by conventional techniques. The latter are subsequently compression molded and a sheet of any desired size, shape or form is thereby obtained. Thereafter, the polymethylmethacrylate is extracted from the resultant sheet structure by means of several washings with acetone. The latter solvent selectively extracts from the sheet all the polymethylmethacrylate present. Further, separate washings of the so-extracted sheet with ethyl alcohol and water, respectively, are performed and then the sheet is rolled between, for instance, blotter paper so as to dry it. If desired, an active catalyst, exemplary of which are platinum, palladium, copper, silver and a silver-mercury amalgam, can be incorporated directly into the so-treated polytetrafluoroethylene sheet during the milling step. One other method for accomplishing the incorporation of an active catalyst is, for instance, by impregnating the sheet in an alcoholic solution of chloroplatinic acid, followed by thermal degradation of the latter acid in the presence of hydrogen. However, this platinization or metal activation procedure is not a critical operation in the preparation of the cathode employed in the aforementioned metal-air battery of the present invention.

The added elctrolyte solution is alkaline. Preferably, from about a 6 N to about 10 N aqueous potassium hydroxide solution is introduced into each cell. Other equivalent electrolytes, such as sodium hydroxide, or lithium hydroxide, can also be utilized, if desired.

In order to further clarify the invention, there is shown in the accompanying drawings preferred embodiments of the metal-air battery and these will be descibed in detail.

In the drawing:

FIGURE 1 is an exploded plan view, partially in section, of an alkaline metal-air battery employing the novel cathode hereinabove defined;

FIGURE 2 is a partially expanded side view, partially in section, of the battery of the present invention; and FIGURE 3 is an alternative embodiment of an exploded plan view, partially in section, of a cell which comprises a single unit of the overall battery of the invention.

In FIGURE 1, there is shown a port 1 for the introduction of electrolyte into a confined area 2. If desired, it may be closed by an appropriate sealer. This area is determined by a polyethylene electrolyte chamber 3. This ring is so designed as to receive in its recess a gasket 4 which snugly houses a metal anode electrode, such as zinc 5. Directly contacting the electrode 5 is a metal screen 6 which is supported within a second sealing gasket 7. In contact with and facing the screen is a metallic sheet 8.

On the opposite face of the polyethylene electrolyte chamber 3 is positioned a graphite-filled, highly porous, extensively fibrillated polytetrafluoroethylene cathode structure 9. Abutting the opposite face of the cathode 9 are spaced elements 10 adapted for the diffusion of air which comprise a metallic screen 11, a metallic ring 12 which positions a metallic screen 13. The latter screens are of size and shape sufficient to overlap the metallic ring 12. When all the elements are pressed together, resultant cell takes the shape of a thin wafer. A plurality of the latter thin wafers comprises a battery.

In FIGURE 2, there is depicted a battery comprising three compressed cells. There is shown a vent 21, 21a and 21b for the insertion of electrolyte. Electrolyte chamber 22, 22a and 22b holds introduced electrolyte solution, said chamber being confined by a polyethylene electrolyte chamber or ring 23, 23a and 23b. The electrolyte directly contacts a suitable electropositive metal 24, 24a and 24b surrounded at its periphery by a ring gasket 25, 25a and 25b. The metal electrode abuts a metallic screen 26, 26a and 26b, which screen is surrounded by a gasket 27, 27a and 27b. Finally, a metal sheet 28, 28a and 28b abuts the metallic screen so as to confine on one face of the polyethylene electrolyte chamber any electrolyte solution fed into the chamber. To confine the electrolyte completely, the cathode structure 29, 29a and 29b located opposite the anode side is positioned to contact the face of the polyethylene electrolyte chamber. Bipolar connecting air spacer comprises metal screen 31, 31a and 31b, as well as metal foil 32, 32a and 32b, to which a metal screen of either a single or double thickness is provided at 33, 33a and 33b.

Resultant cell units are compressed and at one extremity terminal lead wire 34 is provided and at the opposite terminal end lead wire 35 is provided. The three units are compressed by means of plastic plates 36 and 36a secured by bolted studs 37 and 37a and nuts 38 and 38a.

Advantageously, internal connectors are entirely eliminated. Moreover, since the cells are bi-polar, current is caused to pass directly thruogh the several cells with minimum resistive loss. Thus, the efficiency of the overall battery is markedly enhanced.

In FIGURE 3, another embodiment of the invention is shown. This is substantially the cell corresponding to FIGURE 1. Advantageously, the elements of air spacer 10 in FIGURE 1 is replaced by a single air-metallic spacer 50. Hence, in FIGURE 3, there is shown a port 41 through which electrolyte is introduced into a confined chamber 42 surrounded by a polyethylene electrolyte chamber 43 which is slightly recessed on one face to receive gasket 44. The latter houses a zinc or other suitable metal electrode 45. Abutting the metallic electrode 45 is a screen 46, which snugly fits into a gasket 47 and simultaneously contacts electrode 45. Facing the gasket 47 directly on one of its faces is a metallic sheet 48 which contacts screen 46. On the opposite face of the polyethylene electrolyte chamber 43 is positioned a graphite-filled, highly porous, extensively fibrillated cathode or electrode 49. Electrolyte is thereby retained in the reservoir 42. The face opposite the cathode 49 abuts a ring spacer 50 in which one surface thereof is completely smooth and the other face is provided with protrusions or projections 50a through 50h, inclusive. The protrusions thus allow for air to pass through the ring spacer to contact the porous electrode 49.

In a specific embodiment, there are employed three cells as in FIGURE 1 above, each cell containing a reservoir filled with 6 N potassium hydroxide. In order to prevent the solution from dripping out of the ports into which the alkaline electrolyte solution is added, a suitable sealer, such as a plastic cap, tar or rosin, is applied to the opening. The metallic anode is pure zinc and the metal screens which contact the anode consists essentially of nickel. The active component of the air cathode which measures one inch in diameter is uncatalyzed graphite. A volume of 1.14 cubic inches and an overall battery weight of 0.146 pound comprise the physical measurements of the compressed three cells. When supplying air by means of natural convection at the rate of twenty cubic centimeters per minute, a maximum power of 1.0 watt and a maximum power density equal to 0.71 watt per cubic inch or 6.85 watts per pound are noted. At 2.0 volts and 2.3 volts, respectively, there is also obtained a total corresponding current of 0.34 ampere and 0.21 ampere.

Another specific embodiment of the invention involves the modification of the battery comprising three cells described above. Improved performance can be obtained by catalyzing the graphite, such as by depositing thereon platinum, copper, silver, silver-mercury amalgam, usually in the range of 50%–75% silver to 50%–25% mercury, or palladium. The amount of catalyst deposited may widely vary, preferably from between 1.0 milligram and 20 milligrams of catalyst per square centimeter of electrode surface. Deposition of the catalyst on the graphite can be carried out by various techniques, such as by in situ reduction of chloroplatinic acid utilizing either diphenyl silane or sodium borohydride to precipitate elemental platinum on said graphite. In the modification of the air-electrode, there are prepared two catalyzed graphite electrodes, one containing ten milligrams of silver per square centimeter and the other containing 2.5 milligrams per square centimeter of platinum. These electrodes are used in lieu of the uncatalyzed graphite electrode in an identical manner as described in the specific embodiment above. The improved performance results are reported in the table below.

TABLE

| Characteristics of the Battery | Catalyzed electrode (10 mg./cm.² Ag) | Catalyzed electrode (2.5 mg./cm.² Pt) |
| --- | --- | --- |
| Number of cells | 3 | 3 |
| Electrolyte | 6N KOH | 6N KOH |
| Total volume (cu. in.) | 1.4 | 1.4 |
| Total weight (lb.) | 0.146 | 0.146 |
| Method of air supply | (¹) | (¹) |
| Air electrode, diameter (inch) | 1 | 1 |
| Maximum power (watt) | 1.27 | 1.32 |
| Maximum power density: | | |
| Watts per cu. in | 0.90 | 0.94 |
| Watts per pound | 8.7 | 9.1 |
| Total current at 2.0 volts (a.) | 0.68 | 0.68 |
| Total current at 2.3 volts (a.) | 0.55 | 0.58 |

¹ Natural convection.

Utilizing silver-mercury (75%–25%), copper or palladium in lieu of platinum or silver as the electrode catalyst, substantially the same high performance results are realized.

To demonstrate the marked improved performance of the battery of the present invention, the well-known prior art Edison "Carbonaire" battery which contains two cells and utilizes an alkaline electrolyte is compared. In this regard, there is noted that the Edison battery occupies a total volume of 500 cubic inches and weighs 28 pounds. When supplying air to it by natural convection, there is obtained a maximum power of 4 watts and a power density of only 0.008 watt per cubic inch or 0.143 watt per pound. Thus, the Edison "Carbonaire" battery is found to possess markedly increased total weight and volume as compared to the described battery of the present invention. Further, it appears to lack the corresponding increased power density possessed by the battery of the invention.

Advantageously, the battery of the present invention can be recharged and, alternatively, electrolyte, if desired, can be withdrawn therefrom and fresh electrolyte reintroduced. Further, because of its small size and weight and high power density, the metal-air battery of the invention can be used effectively and efficiently in portable emergency lighting apparatus and in providing the power required to drive power equipment, such as shavers, toothbrushes, portable power drills and even automobiles. Further, the battery of the present invention can be shaped or formed as desired. For most purposes, however, it is contemplated that the design of the battery be in a cylindrical form suitbale for incorporation into powered equipment.

We claim:

1. A metal-air battery of the bi-polar type having positioned therein terminal electrical connectors comprising in combination: a plurality of electrically linked compressed cells, each of said compressed cells consisting essentially of: (a) a metallized air spacer, (b) a graphite-filled, highly porous, extensively fibrillated polytetrafluoroethylene cathode structure which is gas permeable but aqueous electrolyte impermeable, (c) an insulated container adapted to be filled with an aqueous electrolyte, (d) a metal anode, said graphite-filled cathode and metal anode directly contacting electrolyte in said container, and (e) means for electrically connecting said metal anode of one cell with said metallized air spacer of an abutting cell.

2. The battery of claim 1 in which the metallic anode is zinc.

3. The battery of claim 1 in which the metallic screen is nickel screen.

4. The battery of claim 1 in which the electrolyte is potassium hydroxide.

5. The battery of claim 1 in which the electrolyte is sodium hydroxide.

6. The battery according to claim 1 in which the graphite-filled cathode is further platinized.

7. The battery according to claim 1 in which the graphite-filled cathode is further copperized.

8. The battery according to claim 1 in which the graphite-filled cathode is further silverized.

9. The battery according to claim 1 in which the graphite-filled cathode is further palladized.

10. The battery according to claim 1 in which the graphite-filled cathode is further treated with a silver-mercury amalgam.

References Cited

UNITED STATES PATENTS

| | | | |
|---|---|---|---|
| 3,043,898 | 7/1962 | Miller et al. | 136—86 |
| 3,328,205 | 6/1967 | Barber et al. | 136—86 |
| 3,348,974 | 10/1967 | Barber et al. | 136—86 |

ALLEN B. CURTIS, Primary Examiner

PO-1050
(5/69)

UNITED STATES PATENT OFFICE
CERTIFICATE OF CORRECTION

Patent No. 3,462,307          Dated August 19, 1969

Inventor(s) JOHN D. VOORHIES and HENRY P. LANDI

It is certified that error appears in the above-identified patent and that said Letters Patent are hereby corrected as shown below:

Column 1, line 69, cancel "steel" and substitute -- metal --.

Column 2, line 58, insert -- alkaline -- before "metal-air".

Column 3, line 19, cancel "spaced" and substitute -- spacer --.

SIGNED AND
SEALED

DEC 23 1969

(SEAL)
Attest:

Edward M. Fletcher, Jr.
Attesting Officer

WILLIAM E. SCHUYLER, JR
Commissioner of Patents